United States Patent
Sato

(10) Patent No.: US 11,014,496 B2
(45) Date of Patent: May 25, 2021

(54) LIGHTING DEVICE FOR GRAB HANDLE IN VEHICLE

(71) Applicant: YAZAKI CORPORATION, Tokyo (JP)

(72) Inventor: Kazuya Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/249,198

(22) Filed: Jan. 16, 2019

(65) Prior Publication Data

US 2019/0217776 A1 Jul. 18, 2019

(30) Foreign Application Priority Data

Jan. 18, 2018 (JP) .............................. JP2018-006197

(51) Int. Cl.
*B60Q 3/60* (2017.01)
*B60Q 3/267* (2017.01)
*H05B 45/20* (2020.01)
*B60Q 3/80* (2017.01)
*B60N 3/02* (2006.01)

(52) U.S. Cl.
CPC .............. *B60Q 3/267* (2017.02); *B60N 3/02* (2013.01); *B60Q 3/60* (2017.02); *B60Q 3/80* (2017.02); *H05B 45/20* (2020.01); *B60Q 2500/00* (2013.01)

(58) Field of Classification Search
CPC .............................. B60Q 3/80; H05B 33/0872
See application file for complete search history.

(56) References Cited

U.S. PATENT DOCUMENTS

| 7,104,675 B2* | 9/2006 | Chen ....................... | B60Q 3/267 |
| | | | 362/488 |
| 7,987,030 B2* | 7/2011 | Flores ...................... | B60Q 3/80 |
| | | | 701/36 |
| 2013/0135884 A1* | 5/2013 | Stakoe ................... | B60Q 3/267 |
| | | | 362/488 |
| 2014/0218212 A1* | 8/2014 | Nykerk ................ | B60Q 1/2665 |
| | | | 340/901 |
| 2017/0210282 A1* | 7/2017 | Rodriguez Barros . | B60Q 1/484 |
| 2018/0017969 A1* | 1/2018 | Nagy .................. | B60W 30/182 |

FOREIGN PATENT DOCUMENTS

| JP | 2007-186050 A | 7/2007 |
| JP | 2009-107521 A | 5/2009 |

* cited by examiner

*Primary Examiner* — Amy Cohen Johnson
*Assistant Examiner* — Jianzi Chen
(74) *Attorney, Agent, or Firm* — Sughrue Mion, PLLC

(57) ABSTRACT

A lighting device for a grab handle in a vehicle includes the grab handle disposed in a passenger compartment, a lamp embedded in the grab handle, a key sensor capable of detecting an approach of a user having a key into a given range around the vehicle, and a lighting controller configured to control lighting mode of the lamp. The lighting controller controls the lamp [1] to light the lamp in a first lighting mode when user's approach information is input to the lighting controller, [2] to light the lamp in a second lighting mode when lock/unlock information of a door is input to the lighting controller, or [3] to light the lamp in a third lighting mode when open/close information of the door is input to the lighting controller.

11 Claims, 3 Drawing Sheets

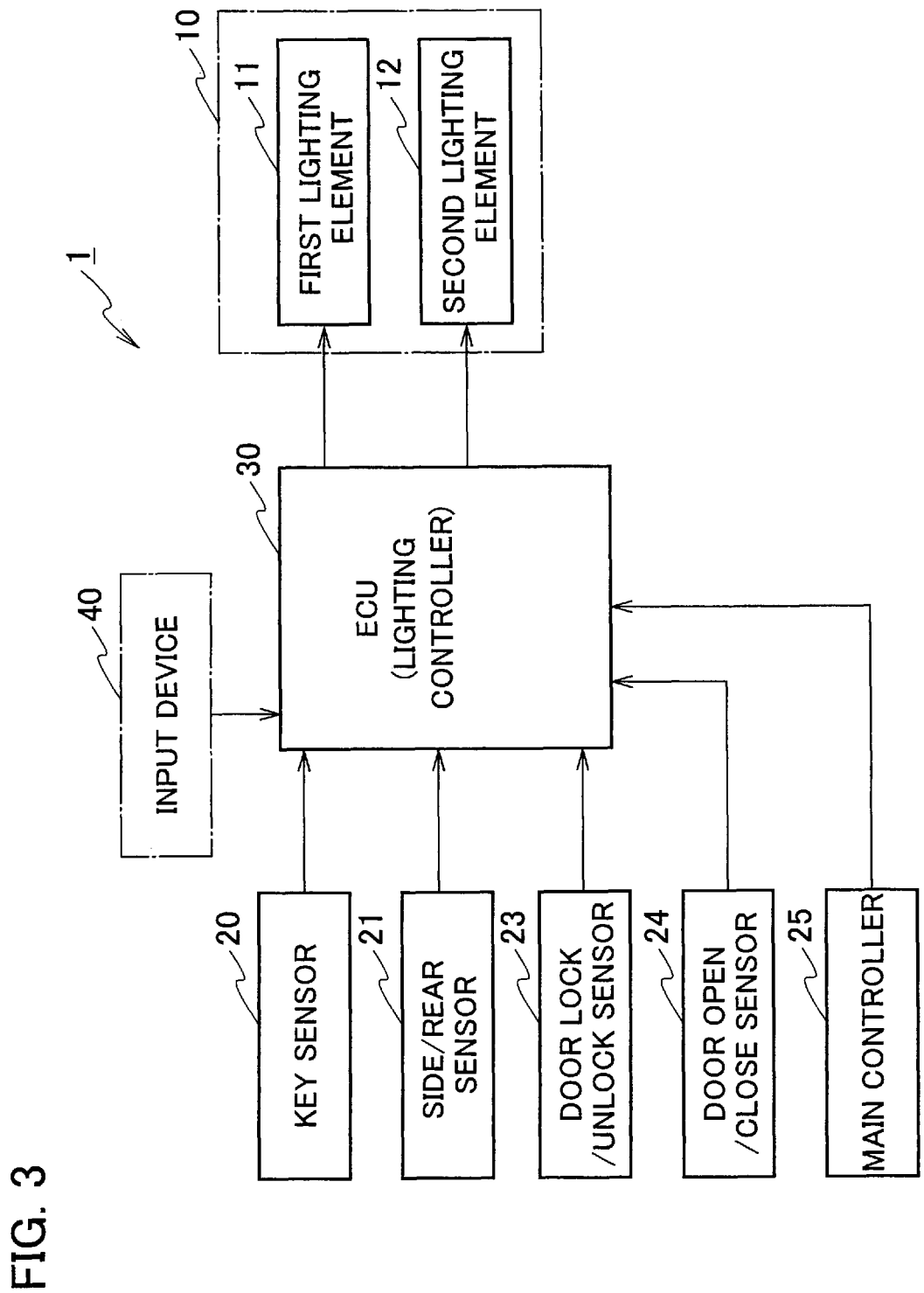

LIGHTING DEVICE FOR GRAB HANDLE IN VEHICLE

CROSS REFERENCE TO RELATED APPLICATION

This application is based upon and claims the benefit of priority from the prior Japanese Patent Application No. 2018-6197 (filing date: Jan. 18, 2018), the entire contents of which are incorporated herein by reference.

BACKGROUND OF THE INVENTION

Technical Field

The present invention relates to a lighting device for a grab handle installed in a vehicle.

Background Arts

A grab handle for assisting a user to get into/out-from a vehicle is known. A grab handle in which a lamp is embedded is also known. A Japanese Patent Application Laid-open No. 2007-186050 and a Japanese Patent Application Laid-open No. 2009-107521 disclose such a grab handle. A lamp for a grab handle as mentioned above indicates a positon of itself, or is used as illumination lighting in a passenger compartment.

SUMMARY OF THE INVENTION

However, it is desired to utilize a lamp for a grab handle as other than a position indicator of the grab handle and an illuminating device. Therefore, an object of the present invention is to provide a lighting device for a grab handle in a vehicle that can be also utilized as an information presentation device, e.g. a display device for presenting vehicle conditions.

An aspect of the present invention provides a lighting device for a grab handle in a vehicle, the lighting device comprising: the grab handle disposed in a passenger compartment of the vehicle; a lamp embedded in the grab handle and capable of being lighted in a plurality of lighting modes; a key sensor capable of outputting user's approach information when detecting that a user having a key of the vehicle approaches into a given range around the vehicle; and a lighting controller configured to control the lighting mode of the lamp based on the user's approach information input from the key sensor, lock/unlock information of a door of the vehicle, or open/close information of the door, wherein the lighting controller controls the lamp to light the lamp in a first lighting mode when the user's approach information is input to the lighting controller, the lighting controller controls the lamp to light the lamp in a second lighting mode when the lock/unlock information is input to the lighting controller, and the lighting controller controls the lamp to light the lamp in a third lighting mode when the open/close information is input to the lighting controller.

BRIEF DESCRIPTION OF THE DRAWINGS

FIG. 3 is a block diagram of the lighting device; and

DESCRIPTION OF THE EMBODIMENTS

Figure 1:
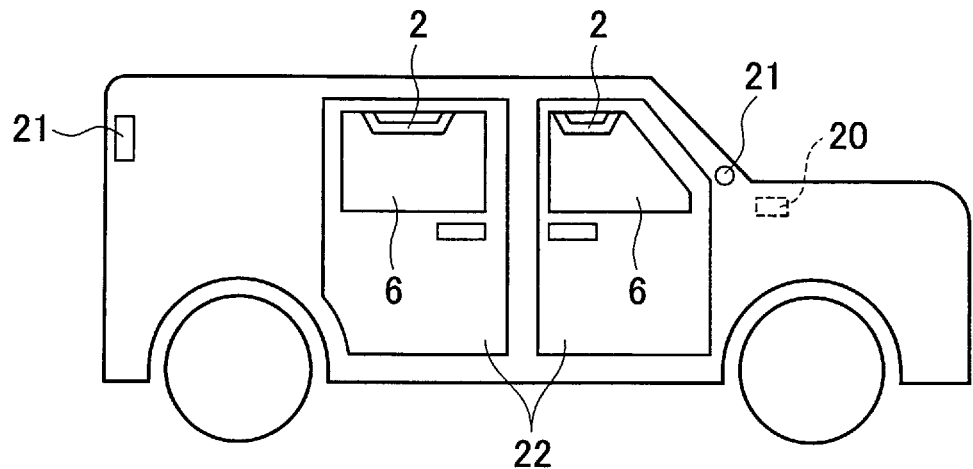
FIG. 1 is a side view of a vehicle in which a lighting device for a grab handle according to an embodiment is installed.

Hereinafter, an embodiment will be explained with reference to FIG. 1 to FIG. 4. A lighting device 1 (shown in FIG. 3) includes grab handles 2, lamps 10 embedded in the grab handles 2, a key sensor 20, a side/rear object sensor 21, and an electrical control unit (ECU) 30. The ECU 30 is a lighting controller that controls lighting modes of the lamps 10.

Figure 2A:
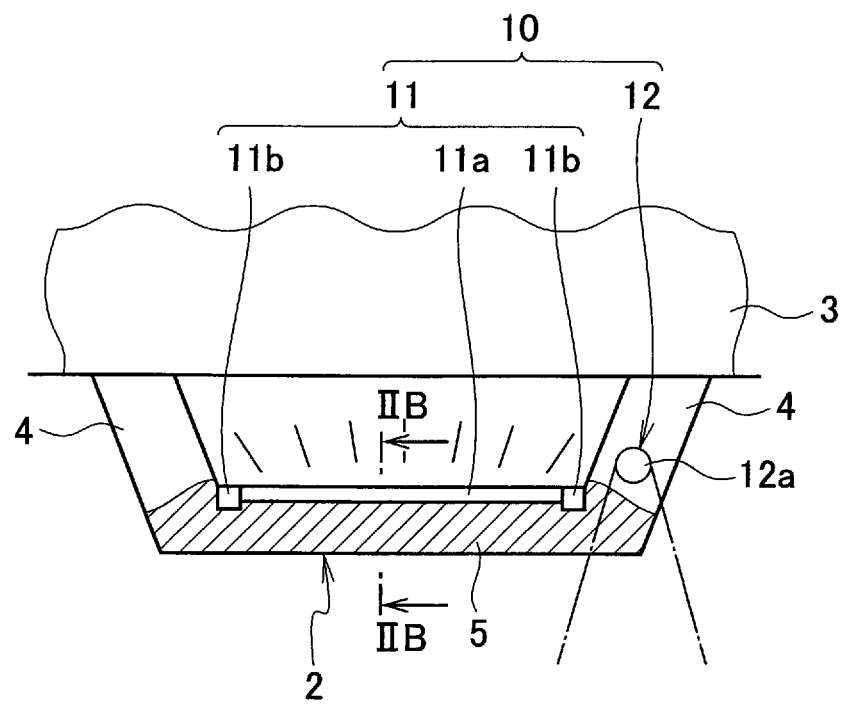
FIG. 2A is a partially cross-sectioned side view of the grab handle.
Figure 2B:
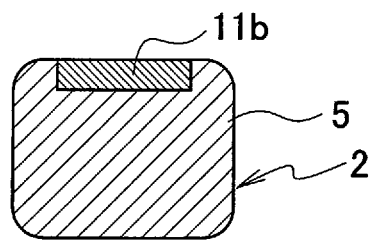
FIG. 2B is a cross-sectional view taken along a line IIB-IIB shown in FIG. 2A.

As shown in FIG. 1, FIG. 2A and FIG. 2B, the grab handles 2 are installed on left and right sides of a roof 3 (e.g. on roof side rails) of a vehicle. The grab handle(s) 2 may be installed on a pillar. Each of the grab handles 2 includes a pair of arms 4 fixed/mounted on the roof 3 and a bar 5 extending between the arms 4 to connecting the arms 4. The bar 5 is located beneath the roof 3, and located a lower position than a position of an upper edge of a door 22. The bar 5 can be seen through a door glass 6 from an outside of the vehicle.

As shown in FIG. 2A and FIG. 2B, the lamp 10 includes a first lighting element 11 embedded in the bar 5, and a second lighting element 12 embedded in one of the arms 4. The first lighting element 11 includes a long light guide plate 11a extending along a longitudinal direction of the bar 5, and a pair of first light sources 11b disposed both ends of the light guide plate 11a, respectively. The light guide plate 11a irradiates light toward the roof 3 in a passenger compartment. Each of the first light sources 11b is a multi-color LED light source (an RGB light source), and can emit light of all colors. The second lighting element 12 includes a second light source 12a that can emit higher-brightness light than that of the first light source(s) 11b. The second light source 12a emits light toward a floor in the passenger compartment.

A key of the vehicle (not shown in the drawings) has a function of sending signals wirelessly to the key sensor 20 in the vehicle. The key is capable of sending at least a lock/unlock signal of the door(s) 22. The key sensor 20 is disposed near meters (not shown in the drawings), e.g. inside an instrument panel of the vehicle. The key sensor 20 detects whether or not a user having the key approaches into a given range around the vehicle based on a signal sent from the key. When the key sensor 20 receives (detects) user's approach information indicating an approach of a user having the key, the key sensor 20 outputs the user's approach information to the ECU 30. When the key sensor 20 receives (detects) a lock/unlock command of the door(s) 22 sent from the key, the key sensor 20 outputs lock/unlock information to the ECU 30. The side/rear object sensor 21 detects an object (e.g. another vehicle) positioning on a lateral side or a rear side of the vehicle by using millimeter-wave radar or the like. When the side/rear object sensor 21 detects an object, the side/rear object sensor 21 outputs object information to the ECU 30.

The ECU 30 outputs the lock/unlock command of the door(s) 22 to a door lock mechanism (not shown in the drawings) to carry out locking/unlocking of the door(s) 22. A door lock/unlock sensor(s) 23 that detects a lock/unlock state of the door(s) 22 is also provided in the door lock mechanism. In addition, a door open/close sensor(s) 24 that detects an open/close state of the door(s) 22 is provided in the door(s) 22. As shown in FIG. 3, in addition to the user's approach information and the lock/unlock information from the key sensor 20 and the object information from the side/rear object sensor 21, power-on/off information of the vehicle (on/off information of an ignition switch) is also input to the ECU 30 from a main controller 25 of the vehicle. Similarly, lock/unlock state information of the door(s) 22 may be also input to the ECU 30 from the door lock/unlock sensor(s) 23. Open/close information of the door(s) 22 is also input to the ECU 30 from the door open/close sensor(s) 24. Manual/automated drive information and so on are also input to the ECU 30 from the main controller 25. The ECU 30 controls lighting modes of the lamp(s) 10 based on the above-mentioned information input thereto. Specific lighting modes will be explained in following explanations of operations of the lighting device 1.

Figure 4:
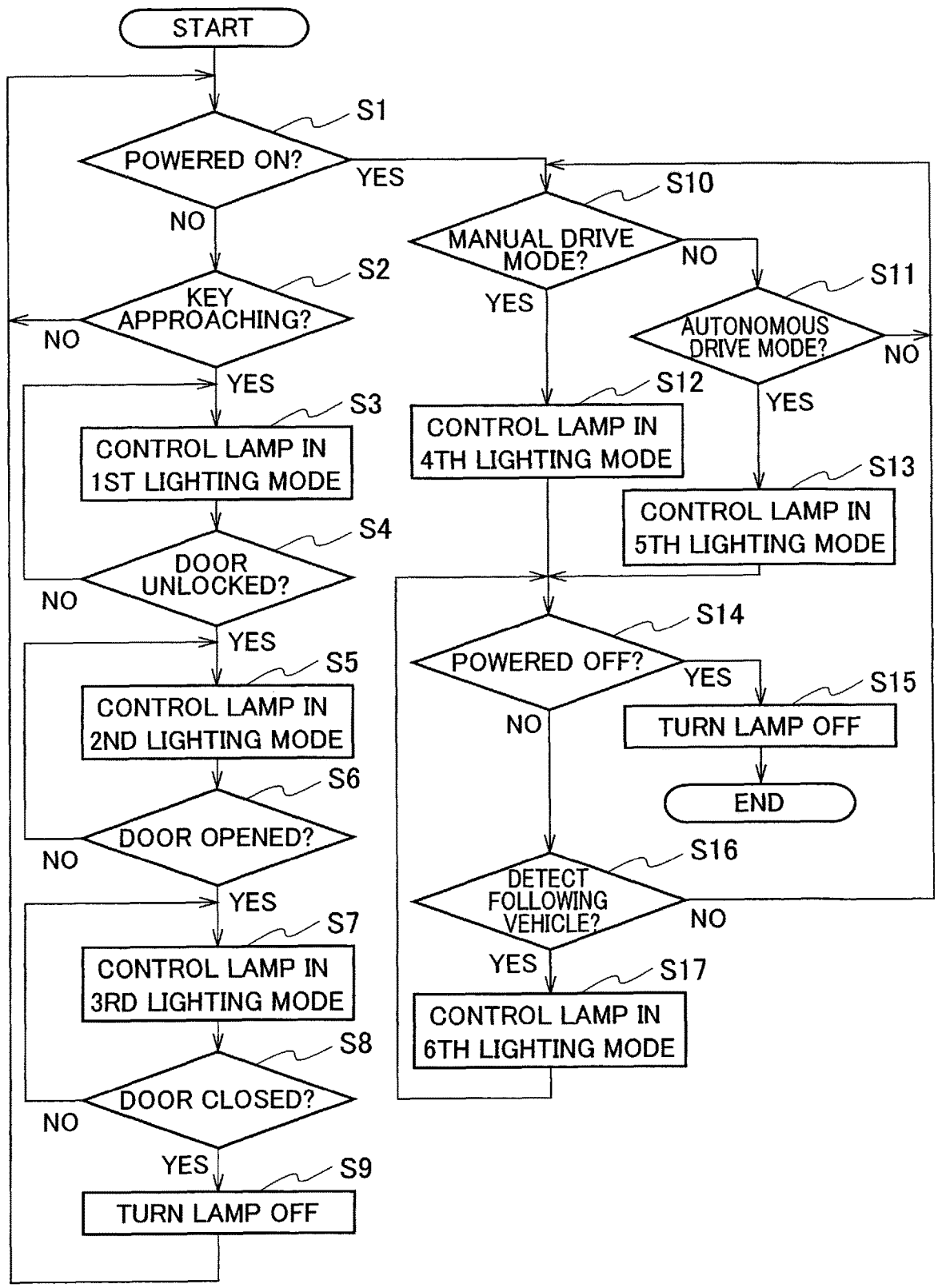
FIG. 4 is a flow chart of a control by the lighting device.

Hereinafter, operations of the lighting device 1 will be explained with reference to a flowchart shown in FIG. 4. The ECU 30 confirms whether the vehicle is powered on or off (a power unit [ICE/motor] of the vehicle is activated or not) (step S1). If the vehicle is being powered off (No in step S1), the ECU 30 then checks information detected by the key sensor 20 (step S2). If the key sensor 20 detects an existence of the key within the given range (detection of the user having the key) (Yes in step S2), the ECU 30 executes processes for lighting the lamp(s) 10 in the first lighting mode (step S3). Specifically, the first lighting elements 11 are lighted in blue. According to the first lighting mode, existences (positions) of the grab handles 2 in the passenger compartment are notified to the user.

Subsequently, the ECU 30 checks whether the door(s) 22 is unlocked or not (step S4). Namely, it is checked whether or not the door(s) 22 is unlocked according to a door unlock command sent from the key. When unlock information of the door(s) 22 is input to the ECU 30 from the key sensor 22 (Yes in step S4), the ECU 30 executes processes for lighting the lamp(s) 10 in the second lighting mode (step S5). Specifically, the first lighting elements 11 are lighted in red. According to the second lighting mode, unlocking of the door(s) 22 is notified to the user.

Subsequently, the ECU 30 checks whether the door(s) 22 is opened (in an opened state) or not (step S6). Namely, it is checked whether or not the door(s) 22 is opened by the user. When open information of the door(s) 22 is input to the ECU 30 from the door open/close sensor(s) 24 (Yes in step S6), the ECU 30 executes processes for lighting the lamp(s) 10 in the third lighting mode (step S7). Specifically, the second lighting element(s) 12 is lighted to emit bright light downward. According to the third lighting mode, a foot area of the user is emblazed to support a user's ride into the vehicle and to create hospitality to the user.

Subsequently, the ECU 30 checks whether the door(s) 22 is closed (in a close state) or not (step S8). Namely, it is checked whether or not the door(s) 22 is closed by the user. When close information of the door(s) 22 is input to the ECU 30 from the door open/close sensor(s) 24 (Yes in step S8), the second lighting element 12 is turned off (step S9). After the step S9, the process flow is returned to the step S1. When the vehicle is powered on (Yes in step S1) by the user to run the vehicle, the ECU 30 checks the drive mode (steps S10 and S11). In a case of the manual drive mode (when receiving manual drive information from the main controller 25: Yes in step S10), the ECU 30 executes processes for lighting the lamp(s) 10 in the fourth lighting mode (step S12). Specifically, the first lighting elements 11 are lighted in blue. According to the fourth lighting mode, it is notified to the user in the passenger compartment that the drive mode is being set to the manual drive mode.

In case of the automated (autonomous) drive mode (when receiving automated drive information from the main controller 25: Yes in step S11), the ECU 30 executes processes for lighting the lamp(s) 10 in the fifth lighting mode (step S13). Specifically, the first lighting elements 11 are lighted in green. According to the fifth lighting mode, it is notified to the user in the passenger compartment that the drive mode is being set to the automated drive mode. When the drive mode is changed from the manual mode to the automated mode, the first lighting elements 11 change their lighting color from blue to green (steps S10-S13 after No in after-explained step S16). When the drive mode is changed from the automated mode to the manual mode, the first lighting elements 11 change their lighting color from green to blue (steps S10-S13 after No in after-explained step S16).

If the side/rear object sensor 21 detects a following (another) vehicle (Yes in step S16) while the vehicle is traveling (No in step S14 subsequent to step S12 or S13), the ECU 30 executes processes for lighting the lamp(s) 10 in the sixth lighting mode (step S17). Specifically, when the following vehicle is on the left side, only the first lighting elements 11 on the left are blinked at short intervals. When the following vehicle is on the right side, only the first lighting elements 11 on the right are blinked at short intervals. When the following vehicle is just behind the vehicle, only the first lighting elements 11 near the rear seats are blinked at short intervals. The first lighting elements 11 are blinked in red or orange, for example. If the following vehicle becomes undetected by the side/rear object sensor 21, namely gets away from the vehicle (No in step S16), the lighting mode is resumed to the mode that indicates the manual mode or the automated mode. When the vehicle is powered off (Yes in step S14), namely the user is going to stop using the vehicle, the lamp(s) 10 is turned off (step S15).

According to the present embodiment, it becomes possible to indicate existences (positions) of the grab handles 2 to the user having the key of the vehicle and approaching to the vehicle, and to utilize the lighting device as an information presentation device that indicates various information of the vehicle such as a lock/unlock state of the door(s) 22 and an open/close state of the door(s) 22.

Note that, in a case where an input device 40 (shown in FIG. 3) such as a touchscreen is provided to add a customizing function of the lighting modes, additional value of the lighting device 1 is further improved. In addition, various conditions of the vehicle can be adopted as a vehicle condition notified by the lighting device 1 other than the conditions adopted in the above embodiment. For example, insufficient closing of the door(s) 22 may be notified by the lighting device 1. Information or condition for economical driving may be notified by the lighting device 1.

The present invention is not limited to the above-mentioned embodiment, and it is possible to embody the present invention by modifying its components within the scope of the present invention. Further, it is possible to form various kinds of inventions by appropriately combining a plurality of components disclosed in the above-mentioned embodiment. For example, it may be possible to omit several components from all of the components shown in the above-mentioned embodiment.

What is claimed is:

1. A lighting device for a vehicle, the lighting device comprising:
   a grab handle disposed in a passenger compartment of the vehicle;

a lamp embedded in the grab handle and capable of being lighted in a plurality of lighting modes;

a key sensor capable of outputting user's approach information when detecting that a user having a key of the vehicle approaches into a given range around the vehicle; and a lighting controller configured to control the lighting mode of the lamp based on the user's approach information input from the key sensor, lock/unlock information of a door of the vehicle, and open/close information of the door, wherein the lighting controller controls the lamp to light the lamp in a first lighting mode based on the user's approach information being input to the lighting controller, the lighting controller controls the lamp to light the lamp in a second lighting mode based on the lock/unlock information being input to the lighting controller, the lighting controller controls the lamp to light the lamp in a third lighting mode based on the open/close information being input to the lighting controller, the lamp embedded in the grab handle includes at least one first light source and a second light source, and the at least one first light source is configured to emit light towards a roof of the vehicle without emitting light towards a floor of the vehicle, and the second light source is configured to emit light towards the floor of the vehicle without emitting light towards the roof of the vehicle.

2. The lighting device according to claim 1, wherein the lighting controller controls the lamp to light the lamp in a fourth lighting mode based on manual drive information being input to the lighting controller, the manual drive information indicating that a drive mode of the vehicle is a manual drive mode, the lighting controller controls the lamp to light the lamp in a fifth lighting mode based on automated drive information being input to the lighting controller, the automated drive information indicating that the drive mode of the vehicle is an automated drive mode.

3. The lighting device according to claim 2, wherein the fourth lighting mode includes the at least one first light source emitting light towards the roof, and the fifth lighting mode includes the at least one first light source emitting light, differently from the fourth lighting mode.

4. The lighting device according to claim 3, wherein the grab handle is disposed inside the vehicle, on the roof of the vehicle.

5. The lighting device according to claim 1, further comprising:

a side/rear sensor capable of detecting a positioning of a second vehicle on a lateral side or a rear side of the vehicle and outputting object information to the lighting controller when detecting the second vehicle on the lateral side or the rear side of the vehicle, wherein the lighting controller controls the lamp to light the lamp in a sixth lighting mode based on the detection information being input to the lighting controller.

6. The lighting device according to claim 1, wherein the first lighting mode, the second lighting mode, and the third lighting mode are different from each other in lighting colors and/or lighting pattern.

7. The lighting device according to claim 1, wherein the first lighting mode includes the at least one first light source emitting light towards the roof, the second lighting mode includes the at least one first light source emitting light, differently from the first lighting mode, and the third lighting mode includes the second light source emitting light towards the floor of the vehicle.

8. The lighting device according to claim 7, wherein the grab handle is disposed inside the vehicle, on the roof of the vehicle.

9. The lighting device according to claim 5, wherein the sixth lighting mode includes the at least one first light source emitting light towards the roof such that the lamp indicates that the second vehicle is on a same side of the vehicle as the lamp.

10. The lighting device according to claim 9, wherein the grab handle is disposed inside the vehicle, on the roof of the vehicle.

11. The lighting device according to claim 1, wherein the grab handle is disposed inside the vehicle, on a roof of the vehicle.

* * * * *